United States Patent
Kuroki et al.

(10) Patent No.: US 8,840,295 B2
(45) Date of Patent: Sep. 23, 2014

(54) BACKLIGHT SYSTEM

(75) Inventors: Shunichiro Kuroki, Tokyo (JP);
Kenichi Hashizume, Gunma (JP)

(73) Assignee: Empire Technology Development LLC, Wilmington, DE (US)

( * ) Notice: Subject to any disclaimer, the term of this patent is extended or adjusted under 35 U.S.C. 154(b) by 34 days.

(21) Appl. No.: 13/817,803

(22) PCT Filed: Jul. 25, 2012

(86) PCT No.: PCT/JP2012/004741
§ 371 (c)(1),
(2), (4) Date: Feb. 19, 2013

(87) PCT Pub. No.: WO2014/016871
PCT Pub. Date: Jan. 30, 2014

(65) Prior Publication Data
US 2014/0218967 A1   Aug. 7, 2014

(51) Int. Cl.
*F21V 8/00*   (2006.01)
*F21K 99/00*   (2010.01)

(52) U.S. Cl.
CPC ............ *G02B 6/0003* (2013.01); *G02B 6/0073* (2013.01); *G02B 6/0065* (2013.01); *F21K 9/52* (2013.01)
USPC ........................................... 362/616; 362/84

(58) Field of Classification Search
USPC .................................... 362/616, 84
See application file for complete search history.

(56) References Cited

U.S. PATENT DOCUMENTS

| | | |
|---|---|---|
| 5,608,550 A | 3/1997 | Epstein et al. |
| 5,764,845 A | 6/1998 | Nagatani et al. |
| 5,799,126 A | 8/1998 | Nagatani et al. |
| 8,061,882 B2 | 11/2011 | Bita et al. |
| 2001/0030860 A1 | 10/2001 | Kimura et al. |
| 2002/0163791 A1* | 11/2002 | Hoelen et al. .................. 362/31 |

(Continued)

FOREIGN PATENT DOCUMENTS

| | | |
|---|---|---|
| CN | 101793366 | 8/2010 |
| JP | 07-098413 | 4/1995 |

(Continued)

OTHER PUBLICATIONS

Acryl Based Elastomer "Kurarity", Information was available at website; http://www.kuraray.co.jp/en/products/chemical/kurarity.html; in some form no later than May 25, 2011. While no copy of the website as it existed on May 25, 2011, is in Applicant's possession, Applicant has provided a copy of the website that was printed on Dec. 13, 2012.

(Continued)

*Primary Examiner* — Laura Tso
(74) *Attorney, Agent, or Firm* — Knobbe, Martens, Olson & Bear, LLP

(57) ABSTRACT

A backlight system includes a first light guide layer, first light sources, a second light guide layer and second light sources. The first light sources are configured to emit first light into the first light guide layer. The second light guide layer is arranged on a first surface of the first light guide layer. The second light guide layer contains light-excited fluorophores. The second light sources are configured to emit second light into the second light guide layer in synchronization with the emission of the first light sources.

24 Claims, 6 Drawing Sheets

(56) References Cited

U.S. PATENT DOCUMENTS

| | | | |
|---|---|---|---|
| 2005/0030732 | A1 | 2/2005 | Kimura et al. |
| 2007/0177406 | A1 | 8/2007 | Kimura et al. |
| 2009/0129053 | A1 | 5/2009 | Tsai |
| 2009/0129115 | A1 | 5/2009 | Fine et al. |
| 2009/0175050 | A1 | 7/2009 | Marttila et al. |
| 2009/0219734 | A1* | 9/2009 | Sawada et al. ............... 362/616 |
| 2009/0316069 | A1 | 12/2009 | Kimura et al. |
| 2010/0207933 | A1 | 8/2010 | Suzuki et al. |
| 2010/0253881 | A1* | 10/2010 | Han et al. ........................ 349/65 |
| 2012/0081920 | A1* | 4/2012 | Ie et al. ......................... 362/609 |
| 2012/0105765 | A1* | 5/2012 | Kawai et al. ................... 349/62 |

FOREIGN PATENT DOCUMENTS

| | | |
|---|---|---|
| JP | 07-098416 | 4/1995 |
| JP | 2002-015612 | 1/2002 |
| JP | 2003-098354 | 4/2003 |
| JP | 2003-162241 | 6/2003 |
| JP | 2006-073202 | 3/2006 |
| JP | 2008-277286 | 11/2008 |
| JP | 2009-016289 | 1/2009 |
| JP | 2010-152370 | 7/2010 |
| JP | 2010-177153 | 8/2010 |
| JP | 2010-212264 | 9/2010 |
| JP | 2010-244013 | 10/2010 |
| JP | 2011-086637 | 4/2011 |
| WO | WO 2012-039354 | 3/2012 |
| WO | PCT/JP2012/03906 | 6/2012 |

OTHER PUBLICATIONS

Development of Novel Transparent Fluorescent Compounds and Their Application to Emission Devices, Information was available at website; www.toshiba.co.jp/tech/review/2007/05/62_05pdf/f01.pdf; in some form no later than May 25, 2011. While no copy of the website as it existed on May 25, 2011, is in Applicant's possession, Applicant has provided a copy of the website that was printed on Dec. 13, 2012.

Hasegawa et al., "Enhanced Emission of Duterated Tris(hexafluoroacetylacetonato)neodymium(III) Complex in Dolution by Suppresion of Radiationless Transition via Vibrational Excitation," Chem. Phys. Lett., 1996.

Hasegawa et al., "Luminescence of Novel Neodymium Sulfonylaminate in Organic Media," Angew. Chem., 2000, p. 357, vol. 39.

Intelligent Dynamic LED (Sony); Information was available at website: http://www.sonyinsider.com/2010/06/08/the-difference-between-the-sony-bravia-xbr8-and-hx900/; in some form no later than May 25, 2011. While no copy of the website as it existed on May 25, 2011, is in Applicant's possession, Applicant has provided a copy of the website that was printed on Dec. 13, 2012.

Interferometric Display; information was available at website: http://www.mirasoldisplays.com/, in some form no later than May 25, 2011. While no copy of the website as it existed on May 25, 2011, is in Applicant's possession, Applicant has provided a copy of the website that was printed on Nov. 29, 2012.

International Search Report dated Oct. 9, 2012, received in International Application PCT/JP2012/004741, filed Jul. 25, 2012.

International Search Report received in International Application No. PCT/JP2012/003906, filed on Jun. 14, 2012, dated Sep. 18, 2012.

Local Dimming, Information was available at website: http://www.displayblog.com/wp-content/uploads/2008/08/samsung_40_led_blu_02.jpg; in some form no later than May 25, 2011. While no copy of the website as it existed on May 25, 2011, is in Applicant's possession, Applicant has provided a copy of the website that was printed on Dec. 13, 2012.

Olefin Based Elastomer "Zeras", Information was available at website; http://www.mcc-spd.com/en/product/zelas/zelas.html; in some form no later than May 25, 2011. While no copy of the website as it existed on May 25, 2011, is in Applicant's possession, Applicant has provided a copy of the website that was printed on Dec. 13, 2012.

Oriel Instruments, Metallic Reflector Coating; Information was available at website; www.molalla.com/~leeper/refcoat.pdf; in some form no later than May 25, 2011. While no copy of the website as it existed on May 25, 2011, is in Applicant's possession, Applicant has provided a copy of the website that was printed on Dec. 13, 2012.

Polyurethane Based Elastomer "Visela", Information was available at website; http://www.inoac.co.jp/kasei/products/material/visela/index.html; in some form no later than May 25, 2011. While no copy of the website as it existed on May 25, 2011, is in Applicant's possession, Applicant has provided a copy of the website that was printed on Dec. 13, 2012.

Powerpoint Presentation: Meeting room of Kansai Economic Federation, Dec. 7, 2005, (with English translation).

Sanken Electric Introducing the MCM Module on Light Guide Plate to Realize the Edge-Type Local Dimming; Information was available at website; http://techon.nikkeibp.co.jp/article/NEWS/20091006/176134/, in some form no later than May 25, 2011. While no copy of the website as it existed on May 25, 2011, is in Applicant's possession, Applicant has provided a copy of the website that was printed on Dec. 13, 2012.

Seiko Epson, OLED Frontlight, information was available at website: http://www.stellacorp.co.jp/media/interview_past/0810_epson.html, in some form no later than May 25, 2011. While no copy of the website as it existed on May 25, 2011, is in Applicant's possession, Applicant has provided a copy of the website that was printed on Oct. 15, 2012.

Silicone Rubber "Opticrysta", Information was available at website; http://www.fujipoly.co.jp/products/other_06/Igf/index.htm; in some form no later than May 25, 2011. While no copy of the website as it existed on May 25, 2011, is in Applicant's possession, Applicant has provided a copy of the website that was printed on Dec. 13, 2012.

Sony's Intelligent Dynamic LED Technology Realizing Edge-Type Local Dimming; Information was available at website: http://sonyinsider.com/wp-content/uploads/2010/06/sony2_42.jpg; in some form no later than May 25, 2011. While no copy of the website as it existed on May 25, 2011, is in Applicant's possession, Applicant has provided a copy of the website that was printed on Dec. 13, 2012.

Styrene Based Elastomer "Rabalon", Information was available at website; http://www.mcc-spd.com/en/product/rabalon/rabalon.html; in some form no later than May 25, 2011. While no copy of the website as it existed on May 25, 2011, is in Applicant's possession, Applicant has provided a copy of the website that was printed on Dec. 13, 2012.

Suemasu et al., "Optimum Annealing Condition for 1.5 um Photoluminescence from B-FeSi2 Balls Grown by Reactive Deposition Epitaxy and Embedded in Si Crystal," Journal of Luminescence, 2000, pp. 528-531, vol. 87-89.

Ultra Thin Flexible LCD Display—Plastic Film Base Material; Information was available at website; http://thecoolgadgets.com/ultra-thin-flexible-lcd-display-plastic-film-base-material/; in some form no later than May 25, 2011. While no copy of the website as it existed on May 25, 2011, is in Applicant's possession, Applicant has provided a copy of the website that was printed on Dec. 13, 2012.

Wada et al., High Efficiency Near-IR Emission of Nd(III) Based on Low-Vibrational Environment in Cages of Nano-Sized Zeolites, J. Am. Chem. Soc., 2000, p. 8583, vol. 122.

What is Edge LED, Dynamic Edge LED, and Intelligent Peak LED Backlight? Information was available at website: http://www.sony.com.au.support/faq/454240; in some form no later than May 25, 2011. While no copy of the website as it existed on May 25, 2011, is in Applicant's possession, Applicant has provided a copy of the website that was printed on Dec. 13, 2012.

What is Reflex Technology?, information was available at website: http://www.kentdisplays.com/technology/reflextechnology.html; in some form no later than May 25, 2011. While no copy of the website as it existed on May 25, 2011, is in Applicant's possession, Applicant has provided a copy of the website that was printed on Oct. 15, 2012.

\* cited by examiner

BACKLIGHT SYSTEM

CLAIM FOR PRIORITY

This application is the U.S. national phase entry under 35 U.S.C. §371 of PCT/JP2012/004741, filed Jul. 25, 2012, the entire disclosure of which is hereby incorporated by reference herein.

BACKGROUND

Liquid crystal displays (LCDs) are display devices that use light modulating properties of crystal liquids. As the crystal liquids do not emit light directly, the LCDs require a surface light source to evenly illuminate an entire surface of a panel or screen. Backlighting is a well-known example of a surface light source technology, and thus, a backlight system is typically used for such an LCD. Light-emitting diodes (LEDs) and cold cathode fluorescent lamps (CCFLs) are examples of light sources used for backlight systems.

There are two types of backlight systems depending on the position where such a light source is arranged: edge-light type backlight systems and direct type backlight systems. In the edge-light type backlight system, light sources are arranged on a side surface of a light guide plate. On the other hand, in the direct type backlight system, light sources are arranged directly below a liquid crystal panel. Further, dimming is performed over the light sources in a backlight system using, for example, a local dimming technique. The local dimming technique refers to a technique of dividing a light exit surface of a backlight system into a plurality of areas and then performing light-intensity control for each of the areas.

SUMMARY

A backlight system may include a first light guide layer, a plurality of first light sources, a second light guide layer and a plurality of second light sources. The plurality of first light sources may be arranged on an edge of at least one side of the first light guide layer. Further, the plurality of first light sources may be configured to emit first light into the first light guide layer through the edge of the at least one side of the first light guide layer. The second light guide layer may be arranged on a first surface of the first light guide layer. Further, the second light guide layer may contain light-excited fluorophores therein. The plurality of second light sources may be arranged on an edge of at least one side of the second light guide layer. Further, the plurality of second light sources may be configured to emit second light into the second light guide layer through the edge of the at least one side of the second light guide layer in synchronization with the emission of the first light sources. The first light guide layer may be configured to transmit the first light therein and to emit the first light through a portion of the second light guide layer. The second light guide layer may be configured to transmit the second light therein and to emit white light caused by the light-excited fluorophores illuminated by the second light from the portion thereof.

A display system may include the above-described backlight system.

A method of controlling illumination of a backlight system of the present disclosure may include determining a portion of the above-described backlight system. The method of controlling illumination of a backlight system of the present disclosure may comprise selecting at least one of a plurality of first light sources and at least one of a plurality of second light sources in accordance with the determined portion of the backlight system. The method of controlling illumination of a backlight system of the present disclosure may comprise emitting first light by the at least one first light source through the edge of the at least one side of the first light guide layer, while emitting second light by the at least one second light source through the edge of the at least one side of the second light guide layer in synchronization with the emission of the at least one first light source.

A method of manufacturing the above-described backlight system of the present disclosure is described below.

DETAILED DESCRIPTION

Figure 1:
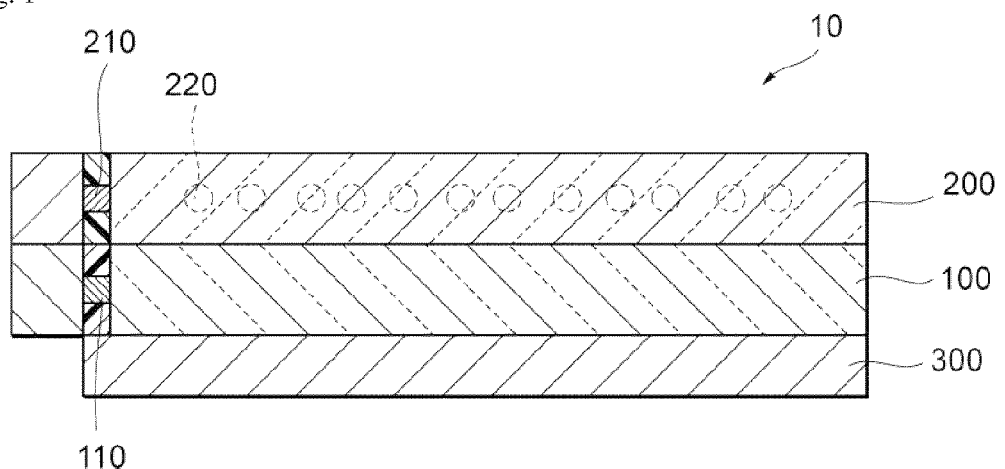
FIG. 1 is a schematic cross-sectional view showing an example of a backlight system arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure describes techniques, structures, devices, apparatuses, systems and methods for back lighting in which first light is introduced into a first light guide layer by at least one of a plurality of first light sources; and in synchronization with this, second light is introduced into a second light guide layer by at least one of a plurality of second light sources that are located at the same positions as the at least one of the plurality of first light sources in a lamination direction.

(Backlight System)

Figure 2:
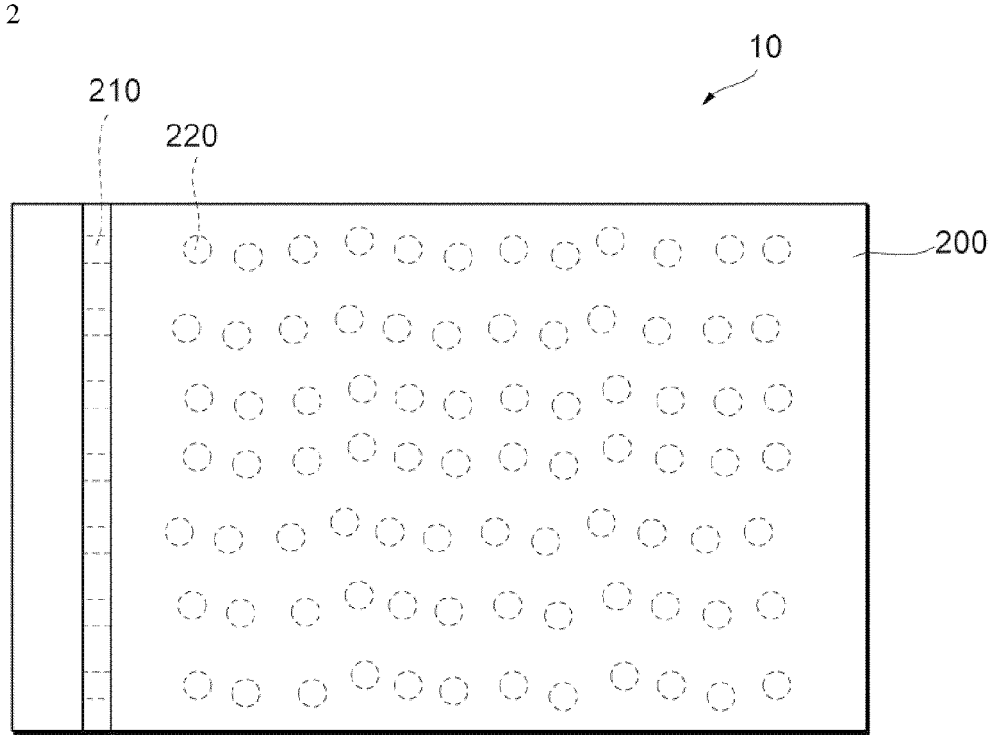
FIG. 2 is a schematic top-down view showing an example of a backlight system arranged in accordance with the present disclosure.
Figure 3:
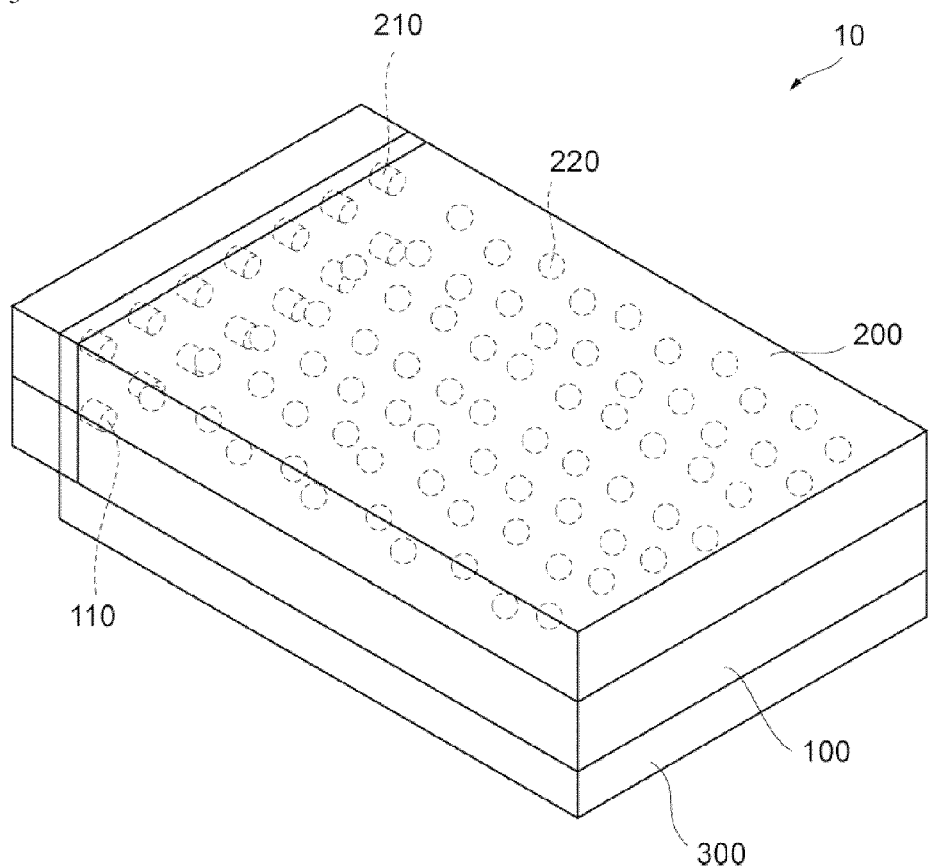
FIG. 3 is a schematic perspective view showing an example of a backlight system arranged in accordance with the present disclosure.

FIGS. 1-3 show a non-limiting example of a backlight system arranged in accordance with the present disclosure. As shown in FIG. 1, a backlight system 10 of the present disclosure may include a first light guide layer 100, a plurality of first light sources 110, a second light guide layer 200, and a plurality of second light sources 210.

(First Light Sources)

Figure 4:
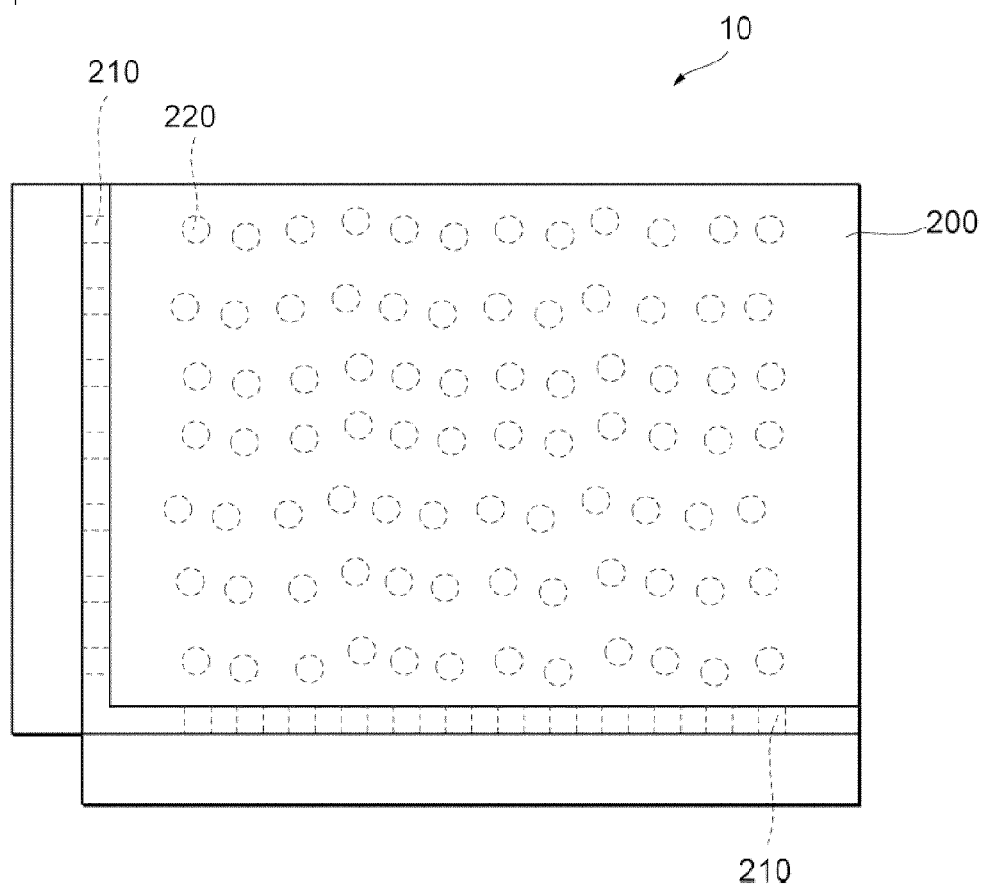
FIG. 4 is a schematic top-down view showing an example of a backlight system arranged in accordance with the present disclosure.
Figure 5:
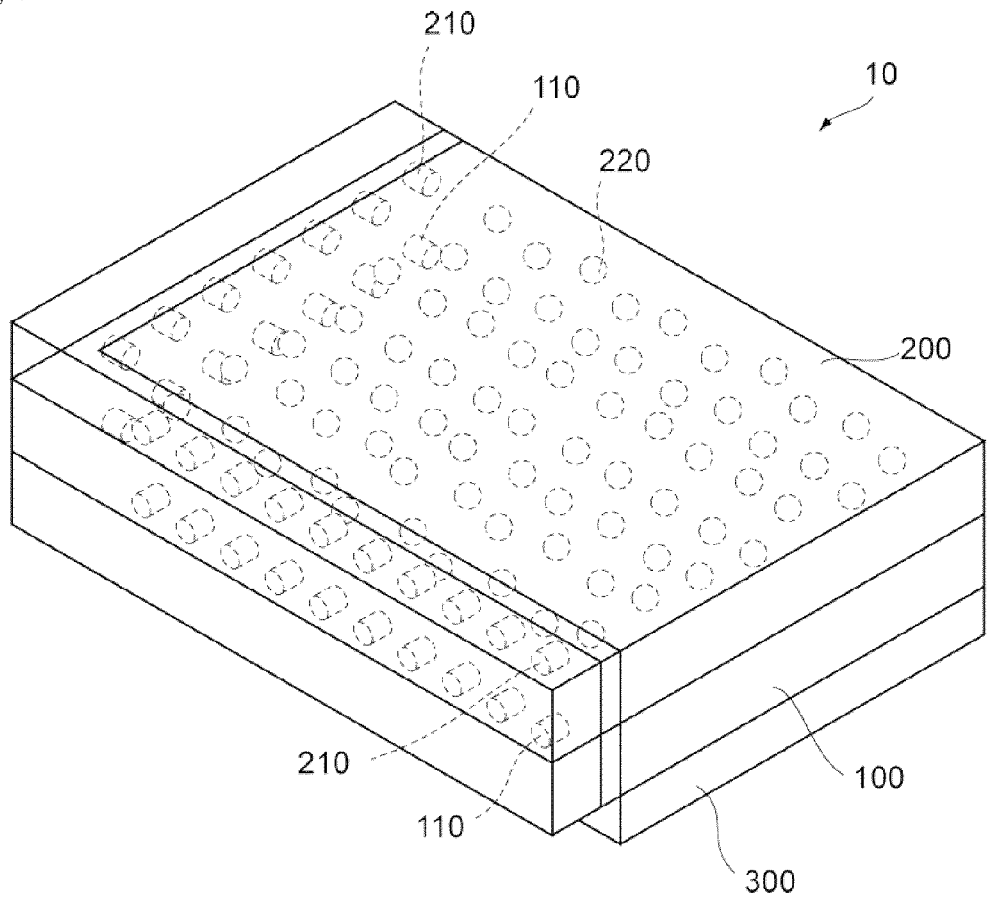
FIG. 5 is a schematic perspective view showing an example of a backlight system arranged in accordance with the present disclosure.

As a non-limiting example, the plurality of first light sources 110 may be arranged on an edge of at least one side of the first light guide layer 100. Further, as shown in FIGS. 4 and 5, at least one of the first light sources 110 may be arranged on an edge of a first side of the first light guide layer 100, and at least another one of the first light sources 110 may be arranged on an edge of a second side orthogonal to the first side of the first light guide layer 100. The plurality of first light sources 110 may be configured to emit first light into the first light guide layer 100 through the edge of the at least one side of the first light guide layer 100. As a further non-limiting example, each of the first light sources 110 may be a light-emitting diode configured to emit visible light such as, but not limited to, white light or pseudo white light. As a further non-limiting example, each of the first light sources 110 may include a set of light-emitting diodes configured to emit white light, for example, a red light-emitting diode, a green light-emitting diode, and a blue light-emitting diode.

(Second Light Sources)

As a non-limiting example, the plurality of second light sources 210 may be arranged on an edge of at least one side of the second light guide layer 200. Further, as shown in FIG. 4, at least one of the second light sources 210 may be arranged on an edge of a first side of the second light guide layer 200, and at least another one of the second light sources 210 may be arranged on an edge of a second side orthogonal to the first side of the second light guide layer 200. As a further non-limiting example, the plurality of second light sources 210 may be configured to emit second light into the second light guide layer 200 through the edge of the at least one side of the second light guide layer 200 in synchronization with the emission of the first light sources 110. As a further non-limiting example, each of the second light sources 210 is a light-emitting diode configured to emit invisible light such as, but not limited to, ultraviolet light.

(First Light Guide Layer)

The first light guide layer 100 may be configured to transmit the first light therein. A part of the first light may be diffused as it travels through the first light guide layer 100, and accordingly be emitted through a portion thereof to the second light guide layer 200. The first light guide layer 100 may be formed of, for example, Poly(methyl methacrylate), Polycarbonate, Polystyrene, or Polyethylene terephthalate. A non-limiting example of a thickness of the first light guide layer 100 may be in a range of between about 100 micrometers and about 5 millimeters.

(Second Light Guide Layer)

The second light guide layer 200 may be configured to transmit the second light therein and to emit white light caused by light-excited fluorophores 220 illuminated by the second light from the portion thereof. The second light guide layer 200 may be arranged on a first surface of the first light guide layer 100. A non-limiting example of a thickness of the second light guide layer 200 may be, for example, in a range of between about 100 micrometers and about 5 millimeters.

The second light guide layer 200 may contain light-excited fluorophores 220 therein. As a non-limiting example, the light-excited fluorophores 220 may be adapted to emit white light by irradiation of ultraviolet light. As another non-limiting example, the light-excited fluorophores 220 may be comprised of, but are not limited to being comprised of, a metal complex. As a further non-limiting example, the metal complex comprising the light-excited fluorophores 220 may be at least one metal complex selected from the group consisting of europium complex, niobium complex, praseodymium complex, neodymium complex, samarium complex, gadolinium complex, terbium complex, dysprosium complex, holmium complex, erbium complex, thulium complex and ytterbium complex. Further, a specific example of the metal complex may be at least one metal complex selected from the group consisting of compounds represented by the following formulae (1) to (10). The second light guide layer 200 containing the light-excited fluorophores 220 therein may allow the backlight system 10 to provide a high contrast ratio. It would be understood that the contrast ratio refers to a contrast between the maximum luminance and the minimum luminance (maximum luminance/minimum luminance).

[Chem. 1]

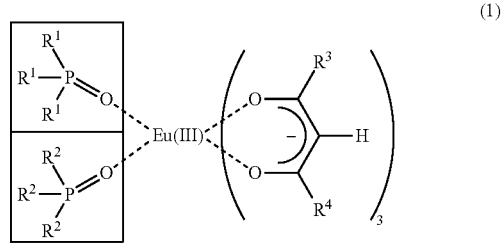

(1)

In formula (1), $R^1$, $R^2$, $R^3$ and $R^4$ each independently represent an organic group, and $R^1$ and $R^2$ differ from each other. Specific examples of $R^1$, $R^2$, $R^3$ and $R^4$ may be, for example, an alkyl group having 1 to 18 carbon atoms, or an alkyl group having 3 to 12 carbon atoms. As the alkyl carbon number increases from the lower limit, the solubility of the compound represented by formula (1) is improved, whereas as the alkyl carbon number decreases from the upper limit, the heat stability of the compound represented by formula (1) is improved.

[Chem. 2]

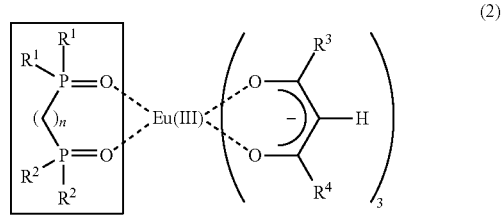

(2)

In formula (2), $R^1$, $R^2$, $R^3$ and $R^4$ each independently represent an organic group, and $R^1$ and $R^2$ differ from each other. Specific examples of $R^1$, $R^2$, $R^3$ and $R^4$ may be, for example, an alkyl group having 1 to 18 carbon atoms, or an alkyl group having 3 to 12 carbon atoms. As the alkyl carbon number increases from the lower limit, the solubility of the compound represented by formula (2) is improved, whereas as the alkyl carbon number decreases from the upper limit, the heat stability of the compound represented by formula (2) is improved.

[Chem.3]

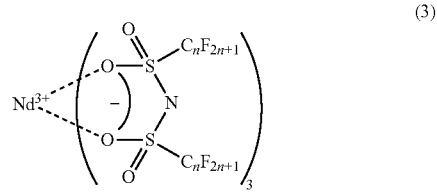

(3)

In formula (3), n is an integer of from 1 to 18 inclusive, and may, as a non-limiting example, be an integer of from 3 to 12 inclusive. As n increases from the lower limit, the solubility of the compound represented by formula (3) is improved, whereas as n decreases from the upper limit, the heat stability of the compound represented by formula (3) is improved.

[Chem. 4]

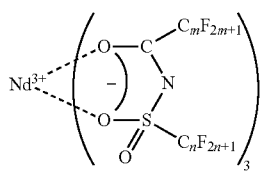

(4)

In formula (4), m and n are each independently integers of from 1 to 18 inclusive, and may, as a non-limiting example, be integers of from 3 to 12 inclusive. As m and n increase from the lower limit, the solubility of the compound represented by formula (4) is improved, whereas as m and n decrease from the upper limit, the heat stability of the compound represented by formula (4) is improved.

[Chem. 5]

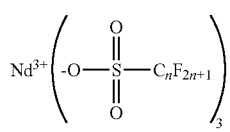

(5)

In formula (5), n is an integer of from 1 to 18 inclusive, and may, as a non-limiting example, be an integer of from 3 to 12 inclusive. As n increases from the lower limit, the solubility of the compound represented by formula (5) is improved, whereas as n decreases from the upper limit, the heat stability of the compound represented by formula (5) is improved.

[Chem. 6]

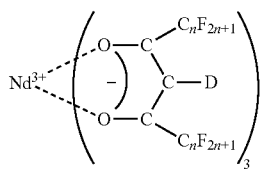

(6)

In formula (6), n is an integer of from 1 to 18 inclusive, and may, as a non-limiting example, be an integer of from 3 to 12 inclusive. As n increases from the lower limit, the solubility of the compound represented by formula (6) is improved, whereas as n decreases from the upper limit, the heat stability of the compound represented by formula (6) is improved. In formula (6), D represents deuterium.

[Chem. 7]

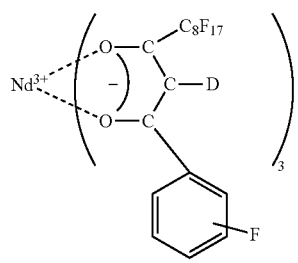

(7)

In formula (7), D represents deuterium.

[Chem. 8]

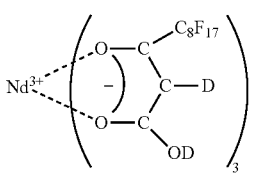

(8)

In formula (8), D represents deuterium.

[Chem. 9]

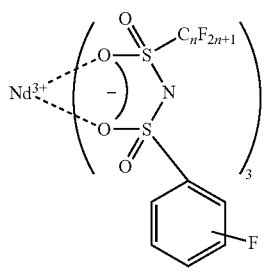

(9)

In formula (9), n is an integer of from 1 to 18 inclusive, and may, as a non-limiting example, be an integer of from 3 to 12 inclusive. As n increases from the lower limit, the solubility of the compound represented by formula (9) is improved, whereas as n decreases from the upper limit, the heat stability of the compound represented by formula (9) is improved.

[Chem. 10]

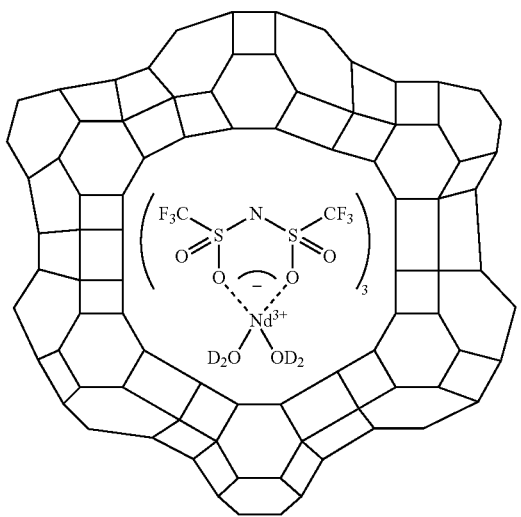

(10)

In formula (10), D represents deuterium.

The concentration of the light-excited fluorophores 220 contained in the second light guide layer 200 may be defined, for example, to increase as the distance from the edge of the at least one side of the second light guide layer 200 increases. By proceeding in this manner, the second light guide layer 200 may have more uniform light emission properties. Further, in such a case, in the backlight system 10, a continuous single layer may be used as a reflective layer 300 described below, leading to a reduction in manufacturing costs.

The second light guide layer 200 may be made of, for example, a transparent polymer material. The second light guide layer 200 may be made of a transparent polymer material. Thus, the contrast ratio can further be improved. As a non-limiting example, the transparent polymer material may be, but is not limited to being, an acrylic resin or a thermoplastic elastomer. The acrylic resin may be, for example, Poly(methyl methacrylate). An example of the thermoplastic elastomer may be at least one thermoplastic elastomer selected from the group consisting of olefin-type elastomer, rubber containing polypropylene, styrene-based elastomer, acryl-based elastomer, polyurethane-based elastomer, silicone rubber, silicone elastomer, polycarbonate film and transparent polyimide. In the backlight system 10 of the present disclosure, the second light guide layer 200 may be formed using the above-described thermoplastic elastomer, whereby the backlight system 10 can be applied to, for example, a flexible display.

(Reflective Layer)

As shown in, for example, FIG. 1, the backlight system 10 may further include the reflective layer 300. The reflective layer 300 may be arranged on a second surface opposing the first surface of the first light guide layer 100. A non-limiting example of a thickness of the reflective layer 300 may be, but is not limited to being, in a range of from a few nanometers to several hundred micrometers. The reflective layer 300 may, for example, contain at least one material selected from the group consisting of a metal, a metal oxide and a polymer. The reflective layer 300 may be comprised of at least one material having a refractive index of 1.7 or higher. Specific examples of the material having a refractive index of 1.7 or higher are Zn, ZnO, ZnS, Zinc White, $PbTiO_2$, ZnTe, $Pb_3O_4$, $PbCrO_4$, $ZnCrO_4$, $Cr_2O_3$, ZrO, $Al_2O_3$, CdO, CdS, AgCl, C (diamond), W, Fe, $Fe_2O_3$, $Fe_3O_4$, $Cu_2O$, CuCl, $CuSO_4$, Sb, $TiO_2$, $BaTiO_3$, $BaCrO_4$, BaS, MgO, Mn, $(NH_4)_2Mn_2(P_2O_7)_2$, $SrTiO_3$, $SrCrO_4$, SrS, Ni, HgS, $Y_2O_3$, $Eu_2O_3$, $La_2O_3$, Pt, Ge, CsI, TlCl, TlBr, $As_2Se_3$, beta-SiC, $ZnS+BaSO_4$, polyethylene terephthalate, triacetylcellulose, Poly(pentabromophenyl methacrylate) and Poly(pentabromobenzyl methacrylate). A specific example of the reflective layer 300 is a layer comprising a zinc-containing compound such as Zn, Zno or ZnS.

The above-described backlight system 10 arranged in accordance with the present disclosure may, for example, be used for a display system.

(Display System)

A display system may be configured to include the above-described backlight system. Such a display system can improve the contrast ratio. A specific example of the display system may be an LCD. The display system may be used for a wide variety of applications including, but not limited to, displays for cell phones, digital cameras, televisions, personal computers, etc.

(Method of Controlling Illumination of a Backlight System)

Figure 6:
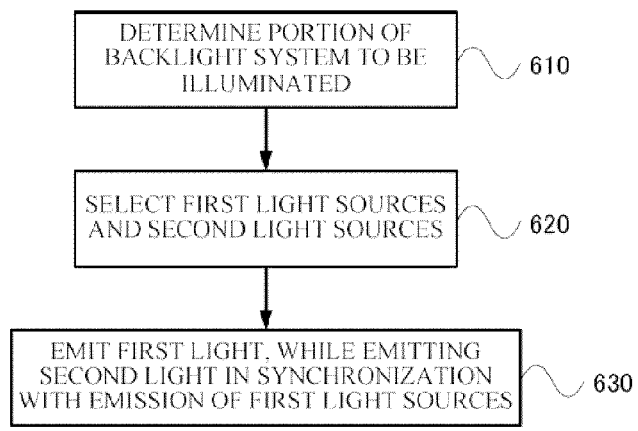
FIG. 6 is a flowchart showing an example of a method of controlling illumination of a backlight system arranged in accordance with the present disclosure.

As shown in FIG. 6, in operation 610, a part of the backlight system 10 which is to be subjected to local dimming may be determined. In operation 620, at least one of the plurality of first light sources 110 and at least one of the plurality of second light sources 210 may be selected in accordance with the determined portion of the backlight system 10. That is, the selected first light sources 110 and second light sources 210 may be positioned so as to align with each other in a stack direction (i.e., a vertical direction). In operation 630, the emission of the selected at least one of the plurality of first light sources 110 may be controlled, and also the emission of the selected at least one of the plurality of second light sources 210 may be controlled. Namely, the plurality of first light sources 110 may emit first light (e.g., white light) into the first light guide layer 100, and in synchronization with this, the plurality of second light sources 210 may emit second light (e.g., ultraviolet light) into the second light guide layer 200. With such a method of controlling the illumination of a backlight system, a light intensity at an arbitrary position of each light guide layer may be strictly controlled, and thus the contrast ratio of the backlight system may be improved.

Figure 7:
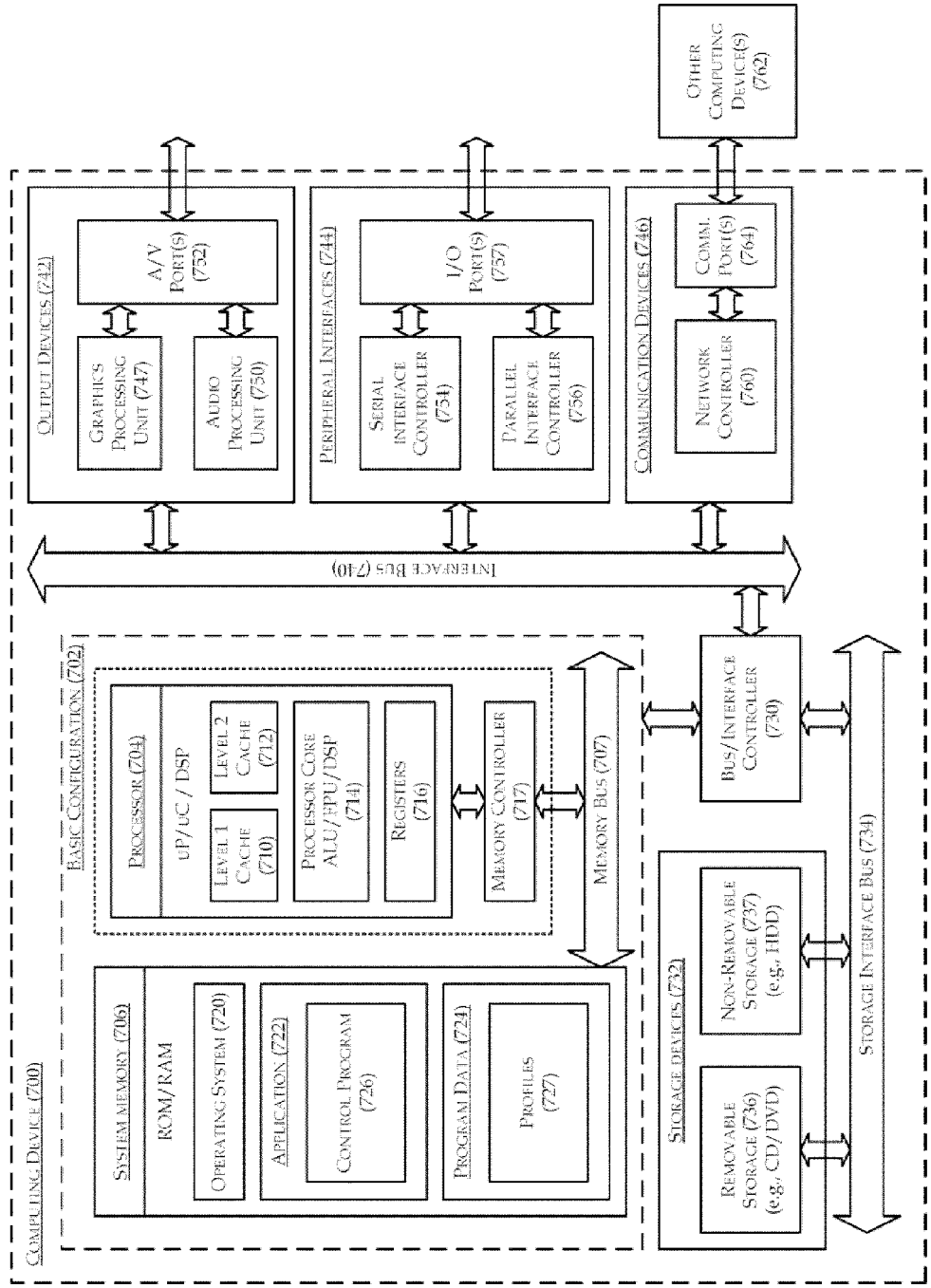
FIG. 7 is a block diagram showing an example of a computing device that is arranged for a backlight system in accordance with the present disclosure.

FIG. 7 is a block diagram illustrating a non-limiting example of a computing device 700 that is arranged for a backlight system in accordance with the present disclosure. In a very basic configuration 702, the computing device 700 typically includes one or more processors 704 and a system memory 706. A memory bus 708 may be used for communicating between the processor 704 and the system memory 706.

Depending on the desired configuration, the processor 704 may be of any type, including, but not limited to, a microprocessor, a microcontroller, a digital signal processor (DSP), or any combination thereof. The processor 704 may include one or more levels of caching, such as a level one cache 710 and a level two cache 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type, including, but not limited to, volatile memory (such as RAM), non-volatile memory (such as ROM, flash memory, etc.) or any combination thereof. The system memory 706 may include an operating system 720, one or more applications 722, and program data 724. The application 722 may include a control program 726 that is arranged to control the individual first light sources 110 and the individual second light sources 210 which may align with the individual first light sources 110 to be emitted in synchronization therewith. The program data 724 may include profiles 728 that may be useful for controlling a backlight system, as is described herein. In some embodiments, the application 722 may be arranged to operate with the program data 724 on the operating system 720 such that the implementations of light guide control may be provided as described herein. This described basic configuration 702 is illustrated in FIG. 7 by those components within the inner dashed line.

The computing device 700 may have additional features or functionality, and additional interfaces to facilitate communications between the basic configuration 702 and any required devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and harddisk drives (HDD), optical disk drives such as compact disk (CD) drives or digital versatile disk (DVD) drives, solid state drives (SSD), and tape drives to name a few. Examples of computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., output devices 742, peripheral interfaces 744, and communication devices 746) to the basic configuration 702 via the bus/interface controller 730. The example output devices 742 include a graphics processing unit 748 and an audio processing unit 750, which may be configured to communicate to various external devices such as a display or speakers via one or more A/V ports 752. The example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. The example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. The computing device 700 may also be implemented as a personal computer including both laptop computer and non-laptop computer configurations.

(Method of Manufacturing Backlight System)

Figure 8:
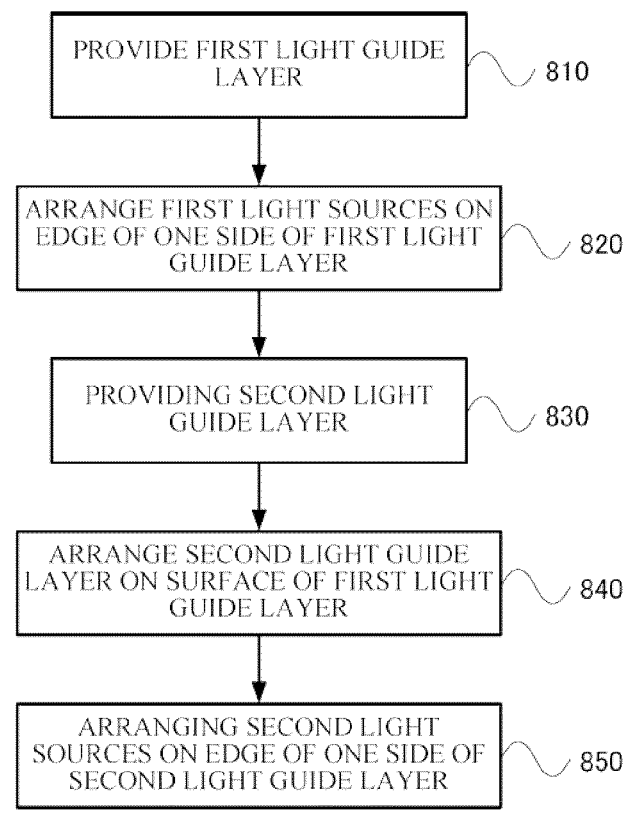
FIG. 8 is a flowchart showing an example of a method of manufacturing a backlight system arranged in accordance with the present disclosure.

As shown in FIG. 8, in operation 810, a first light guide layer 100 may be provided. In operation 820, a plurality of first light sources 110 may be arranged on an edge of at least one side of the first light guide layer 100. First light by the plurality of first light sources 110 may be emitted into the first light guide layer 100 through the edge of the at least one side of the first light guide layer 100. In operation 830, a second light guide layer 200 may be provided. The second light guide layer 200 may be formed to contain the light-excited fluorophores 220 therein. In operation 840, the second light guide layer 200 may be arranged on a first surface of the first light guide layer 100. In operation 850, a plurality of second light sources 210 may be arranged on an edge of at least one side of the second light guide layer 200. Second light by the plurality of second light sources 210 may be emitted into the second light guide layer 200 through the edge of the at least one side of the second light guide layer 200. Moreover, processing of further arranging a reflective layer 300 on a second surface of the first light guide layer 100 opposing the first surface may be performed.

The backlight system obtained by the above-described manufacturing method has a high contrast ratio, and may be used for a display system, in particular, an LCD.

Further, in operation 830, the concentration of the light-excited fluorophores 220 contained in the second light guide layer 200 may be defined, for example, to increase as the distance from the edge of the at least one side of the second light guide layer 200 increases. By proceeding in this manner, a backlight system having more uniform light emission properties may be obtained. Further, the manufacturing method comprising operation 830 described above may use a continuous single layer as the reflective layer, leading to a reduction in manufacturing costs.

Example 1

An example of a backlight system 10 may include a first light guide layer 100, a plurality of first light sources 110, a second light guide layer 200, a plurality of second light sources 210 and a reflective layer 300, as shown in FIG. 3. The second light guide layer 200 may be provided on an upper surface of the first light guide layer 100. The reflective layer 300 may be arranged on a lower surface of the first light guide layer 100. A non-limiting example of a shape of the first light guide layer 100 may be a rectangle. A non-limiting example of a shape of the second light guide layer 200 may be a rectangle. A non-limiting example of a ratio in area between the layers may be the light guide layer 100: the light guide layer 200: the reflective layer 300=1:1:1. The first light guide layer 100 may be formed of, for example, Poly(methyl methacrylate). The second light guide layer 200 may be formed of, for example, Poly(methyl methacrylate). The second light guide layer 200 may contain, for example, a europium complex therein as light-excited fluorophores 220. The concentration of the light-excited fluorophores 220 contained in the second light guide layer 200 may be defined, for example, to increase as the distance from an edge of a left side of the second light guide layer 200 increases. The reflective layer 300 may be formed of a zinc-containing compound.

As a non-limiting example, the plurality of first light sources 110 may be arranged on a left end surface of the first light guide layer 100. As a non-limiting example, the plurality of second light sources 210 may be arranged on a left end surface of the second light guide layer 200. A non-limiting example of the number of the first light sources 110 may be in a range of between 1 and about 1000. The first light sources 110 may, for example, be arranged in a straight line on the left end surface of the first guide layer 100 at regular intervals. A non-limiting example of the number of the second light sources 210 may be in a range of between 1 and about 1000. The second light sources 210 may, for example, be arranged in a straight line on a left end surface of the second guide layer 200 at regular intervals. As a further non-limiting example, each of the first light sources 110 may include a set of light-emitting diodes configured to emit white light, for example, a red light-emitting diode, a green light-emitting diode, and a blue light-emitting diode. As a further non-limiting example, each of the second light sources 210 is a light-emitting diode configured to emit ultraviolet light.

Example 2

Another example of a backlight system 10 is shown in FIG. 5. As shown in FIG. 5, in this example, the first light sources 110 may also be arranged on an edge of a front side orthogonal to an edge of a left side of the first light guide layer 100, and the second light sources 210 may also be arranged on an edge of a front side orthogonal to the edge of the left side of the second light guide layer 200, as shown in FIG. 5.

Display systems including backlight systems as discussed in Specific Examples 1 and 2 can bring about a further improvement in the contrast ratio. A specific example of the display system may be configured by interposing a liquid crystal panel, a middle frame, and the above-described backlight system between a front chassis and a back chassis. Such a display system may be used, for example, for a large liquid crystal monitor, an on-vehicle liquid crystal display (liquid crystal car navigation), a cell phone display, a game-machine liquid crystal display, a medical liquid crystal monitor and a printing/design liquid crystal monitor.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the present disclosure has been described with respect to a limited number of embodiments, those skilled in the art, having the benefit of this disclosure, will appreciate that other embodiments can be devised which do not depart from the scope of the present disclosure as disclosed herein. Accordingly, the scope of the present disclosure should be limited only by the attached claims.

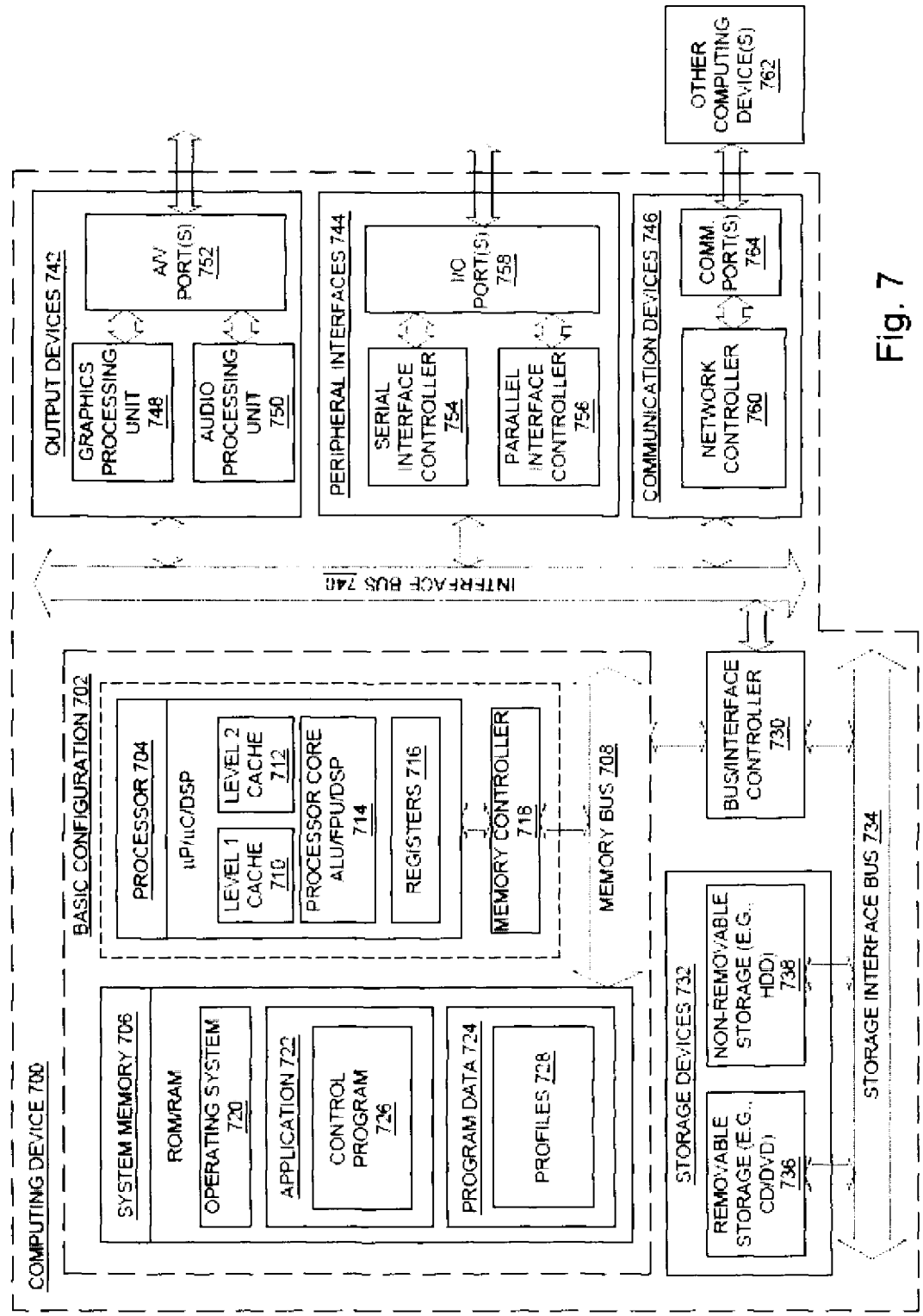

The invention claimed is:

1. A backlight system comprising:
   a first light guide layer;
   a plurality of first light sources arranged on an edge of at least one side of the first light guide layer and configured to emit first light into the first light guide layer through the edge thereof;
   a second light guide layer arranged on a first surface of the first light guide layer and containing light-excited fluorophores therein; and
   a plurality of second light sources arranged on an edge of at least one side of the second light guide layer and configured to emit second light into the second light guide layer through the edge thereof in synchronization with the emission of the first light sources,
   wherein the first light guide layer is configured to transmit the first light therein and to emit the first light through a portion of the second light guide layer, and
   wherein the second light guide layer is configured to transmit the second light therein and to emit white light caused by the light-excited fluorophores illuminated by the second light from the portion thereof.

2. The backlight system of claim 1, further comprising a reflective layer arranged on a second surface of the first light guide layer opposing the first surface.

3. The backlight system of claim 1,
   wherein at least one of the first light sources is arranged on an edge of a first side of the first light guide layer and at least another one of the first light sources is arranged on an edge of a second side of the first light guide layer orthogonal to the first side thereof, and
   wherein at least one of the second light sources is arranged on an edge of a first side of the second light guide layer and at least another one of the second light sources is arranged on an edge of a second side of the second light guide layer orthogonal to the first side thereof.

4. The backlight system of claim 1, wherein each of the first light sources is a light-emitting diode configured to emit white light.

5. The backlight system of claim 1, wherein each of the first light sources is a set of light-emitting diodes configured to emit white light, the set of light-emitting diodes comprising a red light-emitting diode, a green light-emitting diode, and a blue light-emitting diode.

6. The backlight system of claim 1, wherein each of the second light sources is a light-emitting diode configured to emit ultraviolet light.

7. The backlight system of claim 6, wherein the light-excited fluorophores are ultraviolet-excited fluorophores adapted to emit white light by irradiation of the ultraviolet light.

8. The backlight system of claim 1, wherein the light-excited fluorophores are comprised of a metal complex.

9. The backlight system of claim 1, wherein the light-excited fluorophores are comprised of at least one metal complex selected from the group consisting of europium complex, niobium complex, praseodymium complex, neodymium complex, samarium complex, gadolinium complex, terbium complex, dysprosium complex, holmium complex, erbium complex, thulium complex and ytterbium complex.

10. The backlight system of claim 1, wherein the light-excited fluorophores are comprised of at least one metal complex selected from the group consisting of compounds represented by the following formulae (1) to (10);

[Chem. 1]

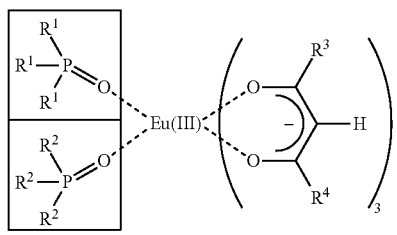
(1)

(wherein, $R^1$, $R^2$, $R^3$ and $R^4$ each independently represent an organic group, and $R^1$ and $R^2$ differ from each other)

[Chem. 2]

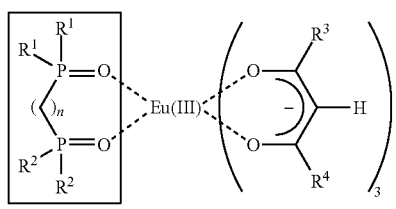
(2)

(wherein, $R^1$, $R^2$, $R^3$ and $R^4$ each independently represent an organic group, and $R^1$ and $R^2$ differ from each other)

[Chem. 3]

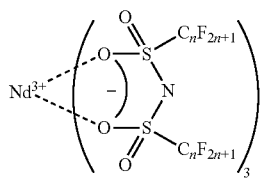
(3)

(wherein, n is an integer of from 1 to 18 inclusive)

[Chem. 4]

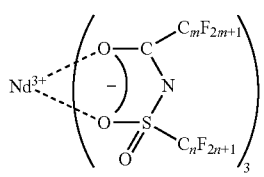
(4)

(wherein, m and n are each independently integers of from 1 to 18 inclusive)

[Chem. 5]

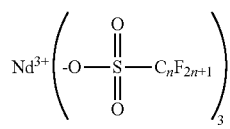
(5)

(wherein, n is an integer of from 1 to 18 inclusive)

[Chem. 6]

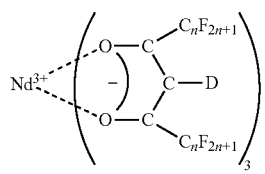
(6)

(wherein, n is an integer of from 1 to 18 inclusive, and D represents deuterium)

[Chem. 7]

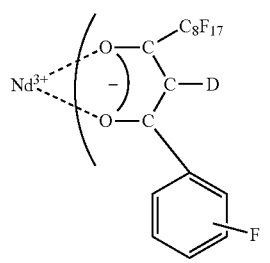
(7)

(wherein, D represents deuterium)

[Chem. 8]

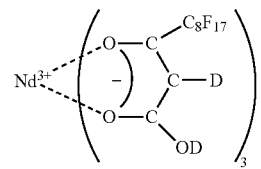
(8)

(wherein, D represents deuterium)

[Chem. 9]

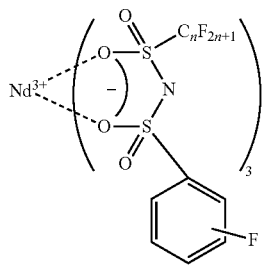
(9)

(wherein, n is an integer of from 1 to 18 inclusive)

[Chem. 10]

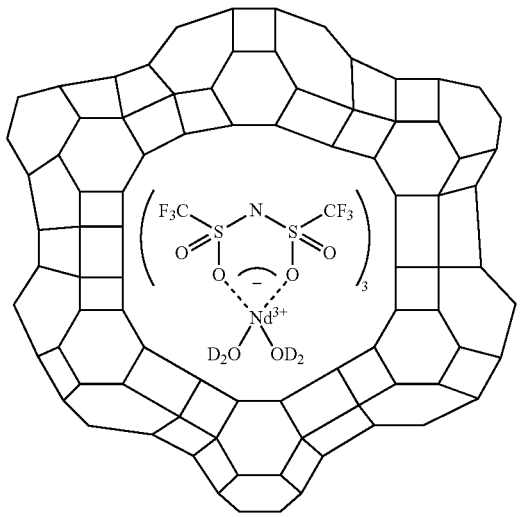
(10)

(wherein, D represents deuterium).

11. The backlight system of claim 1, wherein the second light guide layer is formed of a transparent polymer material.

12. The backlight system of claim 11, wherein the transparent polymer material is an acrylic resin or a thermoplastic elastomer.

13. The backlight system of claim 12, wherein the acrylic resin is Poly(methyl methacrylate).

14. The backlight system of claim 12, wherein the thermoplastic elastomer is at least one thermoplastic elastomer selected from the group consisting of olefin-type elastomer, rubber containing polypropylene, styrene-based elastomer, acryl-based elastomer, polyurethane-based elastomer, silicone rubber, silicone elastomer, polycarbonate film and transparent polyimide.

15. The backlight system of claim 2, wherein the reflective layer contains at least one material selected from the group consisting of a metal, a metal oxide and a polymer.

16. The backlight system of claim 2, wherein the reflective layer is comprised of at least one material having a refractive index of 1.7 or higher.

17. The backlight system of claim 1, wherein a concentration of the light-excited fluorophores is defined so as to increase as the distance from the edge of the at least one side of the second light guide layer increases.

18. A display system comprising a backlight system, wherein the backlight system comprises:
a first light guide layer;
a plurality of first light sources arranged on an edge of at least one side of the first light guide layer and configured to emit first light into the first light guide layer through the edge thereof;
a second light guide layer arranged on a first surface of the first light guide layer and containing light-excited fluorophores therein; and
a plurality of second light sources arranged on an edge of at least one side of the second light guide layer and configured to emit second light into the second light guide layer through the edge thereof in synchronization with the emission of the first light sources,
wherein the first light guide layer is configured to transmit the first light therein and to emit the first light through a portion of the second light guide layer, and
wherein the second light guide layer is configured to transmit the second light therein and to emit white light caused by the light-excited fluorophores illuminated by the second light from the portion thereof.

19. A method of controlling illumination of a backlight system, the method comprising:
determining a portion of the backlight system having a first light guide layer and a second light guide layer arranged on a surface of the first light guide layer, the second light guide layer containing light-excited fluorophores therein;
selecting at least one of a plurality of first light sources and at least one of a plurality of second light sources in accordance with the determined portion, the plurality of first light sources being arranged on an edge of at least one side of the first light guide layer, the plurality of second light sources being arranged on an edge of at least one side of the second light guide layer; and
emitting first light by the at least one first light source through the edge of the at least one side of the first light guide layer, while emitting second light by the at least one second light source through the edge of the at least one side of the second light guide layer in synchronization with the emission of the at least one first light source.

20. The method of claim 19, wherein the first light is white light and the second light is ultraviolet light.

21. The method of claim 20, wherein the light-excited fluorophores are ultraviolet-excited fluorophores configured to emit white light by irradiation of the ultraviolet light.

22. A method of manufacturing a backlight system, the method comprising:
providing a first light guide layer;
arranging a plurality of first light sources on an edge of at least one side of the first light guide layer so as to emit first light into the first light guide layer through the edge thereof;
providing a second light guide layer containing light-excited fluorophores therein;
arranging the second light guide layer on a first surface of the first light guide layer; and
arranging a plurality of second light sources on an edge of at least one side of the second light guide layer so as to emit second light into the second light guide layer through the edge thereof,
wherein the first light guide layer is configured to transmit the first light therein and to emit the first light through a portion of the second light guide layer, and
wherein the second light guide layer is configured to transmit the second light therein and to emit white light caused by the light-excited fluorophores illuminated by the second light from the portion thereof.

23. The method of claim 22, further comprising arranging a reflective layer on a second surface of the first light guide layer opposing the first surface.

24. The method of claim 22, wherein the provision of the second light guide layer includes defining a concentration of the light-excited fluorophores so as to increase as the distance from the edge of the at least one side of the second light guide layer increases.

* * * * *

UNITED STATES PATENT AND TRADEMARK OFFICE
CERTIFICATE OF CORRECTION

| | | |
|---|---|---|
| PATENT NO. | : 8,840,295 B2 | Page 1 of 2 |
| APPLICATION NO. | : 13/817803 | |
| DATED | : September 23, 2014 | |
| INVENTOR(S) | : Kuroki et al. | |

It is certified that error appears in the above-identified patent and that said Letters Patent is hereby corrected as shown below:

On the Title Page, in Item (56), under "OTHER PUBLICATIONS", in Column 1, Lines 8-9, delete "Duterated Tris(hexafluoroacetylacetonato)neodymium(III)" and insert -- Deuterated Tris(hexafluoroacetylacetonate)neodymium(III) --, therefor.

In The Drawings

Delete Drawing Sheet 5 of 6 consisting of FIG. 7 and substitute therefore with the attached Drawing Sheet 5 of 6 showing corrected FIG. 7.

Signed and Sealed this
Twenty-seventh Day of October, 2015

Michelle K. Lee
*Director of the United States Patent and Trademark Office*